(12) United States Patent
Lequesne et al.

(10) Patent No.: US 6,993,983 B2
(45) Date of Patent: Feb. 7, 2006

(54) UNIVERSAL MAGNETOSTRICTIVE FORCE SENSOR

(75) Inventors: Bruno Patrice Bernard Lequesne, Troy, MI (US); Donald T. Morelli, White Lake, MI (US); Thaddeus Schroeder, Rochester Hills, MI (US); Thomas Wolfgang Nehl, Shelby Township, MI (US); Thomas Allen Baudendistel, Farmersville, OH (US)

(73) Assignee: Delphi Technologies, Inc., Troy, MI (US)

( * ) Notice: Subject to any disclaimer, the term of this patent is extended or adjusted under 35 U.S.C. 154(b) by 62 days.

(21) Appl. No.: 10/313,660

(22) Filed: Dec. 6, 2002

(65) Prior Publication Data

US 2004/0107777 A1    Jun. 10, 2004

(51) Int. Cl.
    *G01L 1/12*    (2006.01)
(52) U.S. Cl. ................................. 73/862.69
(58) Field of Classification Search ............... 73/779, 73/862.625, 862.626, 862.69
    See application file for complete search history.

(56) References Cited

U.S. PATENT DOCUMENTS

| | | | | |
|---|---|---|---|---|
| 3,084,298 A | * | 4/1963 | Frisina | 73/862.626 |
| 3,743,988 A | * | 7/1973 | Abel | 335/272 |
| 4,907,462 A | * | 3/1990 | Obama et al. | 73/862.335 |
| 4,989,460 A | * | 2/1991 | Mizuno et al. | 73/862.335 |
| 5,256,920 A | * | 10/1993 | Porzio | 310/13 |
| 5,400,656 A | * | 3/1995 | Schiessle et al. | 73/779 |
| 5,510,660 A | * | 4/1996 | Flatau et al. | 310/26 |
| 5,905,210 A | * | 5/1999 | O'Boyle et al. | 73/862.331 |

* cited by examiner

*Primary Examiner*—Max Noori
(74) *Attorney, Agent, or Firm*—Jimmy L. Funke

(57) ABSTRACT

A magnetostrictive force sensor universally usable in any environment with similar signals unaffected by the surrounding material. To this end, a sensor comprising a shaft of magnetostrictive material with an inductance coil wound around the shaft is provided with a magnetic shell enclosing the coil only or both the coil and the shaft. Upon application of the magnetic field, the resultant flow of magnetic flux is confined to a path through the shaft and the magnetic shell. By confining the magnetic flux path, the dependency of the sensor signal on the surrounding material and environment is essentially eliminated.

35 Claims, 4 Drawing Sheets

UNIVERSAL MAGNETOSTRICTIVE FORCE SENSOR

TECHNICAL FIELD

The present invention relates to a magnetostrictive (Villari effect) force sensor that provides same or similar signals without regard to the surrounding environment in which the sensor is placed.

BACKGROUND OF THE INVENTION

Various materials are known to exhibit the Villari effect, that is, their permeability $\mu$ varies with the stress (force) applied. The Villari effect can be thought of as the inverse of the magnetostrictive effect, which is a change in dimension of a material under applied magnetic field. These materials have been used in various configurations to make force sensors. A simple configuration for a force sensor 10, that will serve here as exemplary, consists of a coil 12 wound around a shaft 14 made of the magnetostrictive material, as shown in FIG. 1. The magnitude of the voltage $V_{coil}$ of the coil 12 is related to its inductance L as follows:

$$|V_{coil}| = 2\pi f I L(\mu) = 2\pi f I L(F) \quad (1)$$

where f is the frequency in Hertz and I the magnitude of the sinusoidal current impressed on the coil 12, and L is the coil inductance. Inductance L, as shown in Eq. 1, is a function of permeability $\mu$ or force F.

The circuit shown in FIG. 1A can be used for the measurement of dynamic inductance, for instance as part of a magnetostrictive force sensing apparatus. Referring to the circuit in FIG. 1A, L is the varying inductance, and R and $R_L$ are fixed resistances. The voltage V is imposed at a frequency f chosen for best sensitivity. The measurement can be performed by measuring the change across a portion of the voltage divider (R) as $V_{out}$. The inductance L is related to the magnitudes of the applied and measured voltages, |V| and |$V_{out}$|, respectively, by the following formula:

$$L = \frac{R}{2\pi f}\sqrt{\frac{1}{k^2} - \left[\frac{R_L}{R} + 1\right]^2}$$

where:

$$k = \frac{|V_{out}|}{|V|}$$

The output voltage $V_{out}$ can be processed by a microprocessor or other similar circuit to obtain a signal that is representative of the change in inductance L. Any non-linearity in the inductance-versus-force function can be also included in the algorithm to provide the desired force measurement output. Compensation factors for temperature variations, etc, may also be included. The resistance values, R and $R_L$, may advantageously be chosen according to the average value of inductance L, frequency f and source V.

The inductance L for a given number of coil turns N is generally a function of the permeability $\mu$ of the shaft 14, and the length l and cross-section A of the magnetic flux path around coil 12:

$$L = \frac{\mu N^2 A}{l} \quad (2)$$

The magnetic field created by the coil 12 thus includes the shaft 14, but also includes a return path as shown schematically by the magnetic flux lines 16 in FIG. 2. Eq. 2 must therefore be expressed as the sum of two terms, one for the shaft 14, indicated by subscript "sh", and one for the return path 16, indicated by subscript "ret":

$$L = N^2 \left[\frac{\mu_{sh} A_{sh}}{l_{sh}} + \frac{\mu_{ret} A_{ret}}{l_{ret}}\right] \quad (3)$$

From Eq. 3, it is clear that the sensor signal is a function of the surrounding material, that is, of the environment around the sensor 10. The signal will differ when surrounded by a magnetic material versus a non-magnetic material or air. Therefore, sensors must currently be designed to take into account the environment in which the sensor is to be used. It would be desirable to devise a sensor in such a way as to remove the dependency on the properties of the surrounding material.

In addition, to obtain a large signal, a material with large magnetostrictive behavior must be chosen for the shaft 14, i.e., a large $\mu$ variation ($\mu_{max} - \mu_{min}$) for a given stress (force) change. However, the average value of $\mu_{sh}$ can also affect the signal. Also, since many magnetostrictive materials are conductive, eddy currents will be induced in the shaft 14, which will restrict the magnetic field towards the outer surface 14a of the shaft 14, thus reducing the effective cross section $A_{sh}$ of the shaft 14. In that sense, a high frequency f results in a larger signal (f is a multiplying factor in Eq. 1), but generates more eddy currents and further restricts the magnetic field to the shaft surface 14a. Thus, design trade-offs are necessary. Therefore, it is further desirable to provide preferred combined values of operating frequency f average permeability $\mu_{sh}$ and resistivity $\rho$ for the magnetostrictive material.

SUMMARY OF THE INVENTION

The present invention provides a magnetostrictive force sensor that can be used in any environment, and that provides similar signals unaffected by the surrounding magnetic material or the environment. To this end, a sensor comprising a shaft of magnetostrictive material with an inductance coil wound around the shaft is provided with a magnetic shell enclosing the coil only or both the coil and the shaft, whereby, upon application of the magnetic field, the resultant flow of magnetic flux is confined to a path through the shaft and the shell. By confining the magnetic flux path, the dependency of the sensor signal on the surrounding environment is essentially eliminated. In an exemplary embodiment, the shell comprises a high permeability, low resistivity material.

BRIEF DESCRIPTION OF THE DRAWINGS

The present invention will now be described, by way of example, with reference to the accompanying drawings, in which.

DETAILED DESCRIPTION

The present invention eliminates the dependency of the sensor signal on the surrounding magnetic material or the environment such that the sensor may be used within any environment. In other words, the sensor of the present invention provides similar signals irrespective of whether it is surrounded by air, conductive but non-magnetic materials (aluminum for instance), or steel. By virtue of this invention, it is possible to insert the sensor inside of a brake caliper without concern for the magnetic and electric properties of the steel used to make the caliper. It is further possible to use the same sensor for other applications, where the sensor might not be surrounded by steel, such as a brake pedal force sensor or seat occupant weight sensor. It could even be used as a laboratory instrument, meant to be transported from application to application, without a need for calibration to account for the sensor's surroundings.

Figure 1:
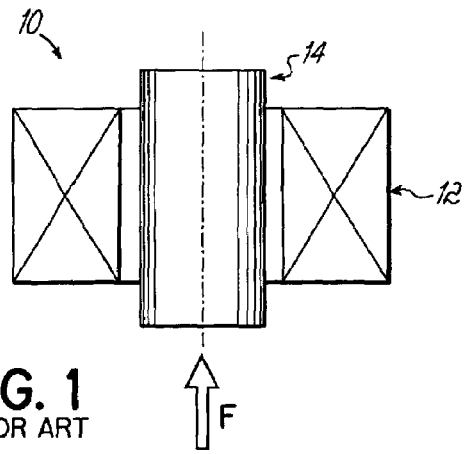
FIG. 1 is a general schematic of a force sensor of the prior art.
Figure 1A:
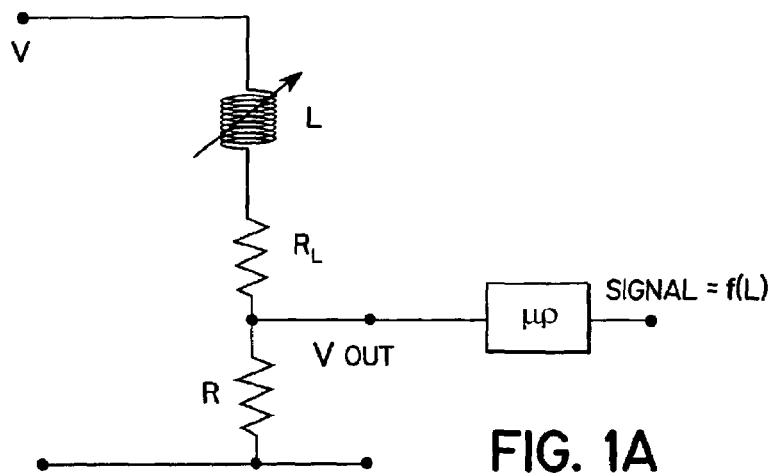
FIG. 1A is a circuit for measuring a dynamically changing inductance.
Figure 2:
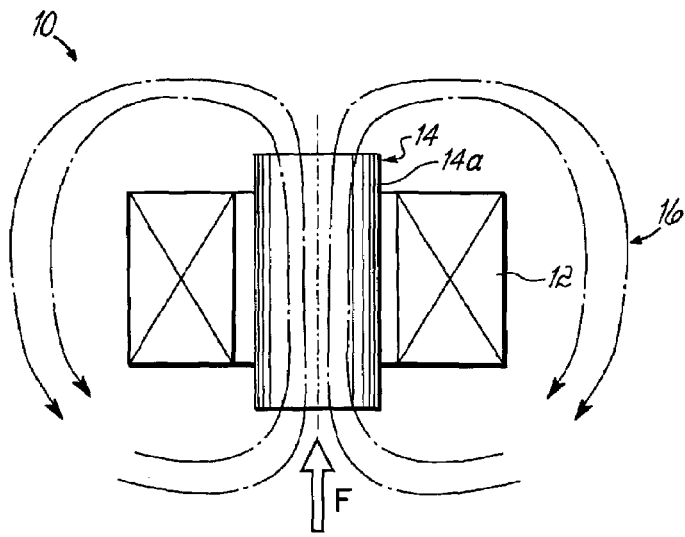
FIG. 2 depicts a general configuration of the magnetic field in the prior art force sensor of FIG. 1.
Figure 3:
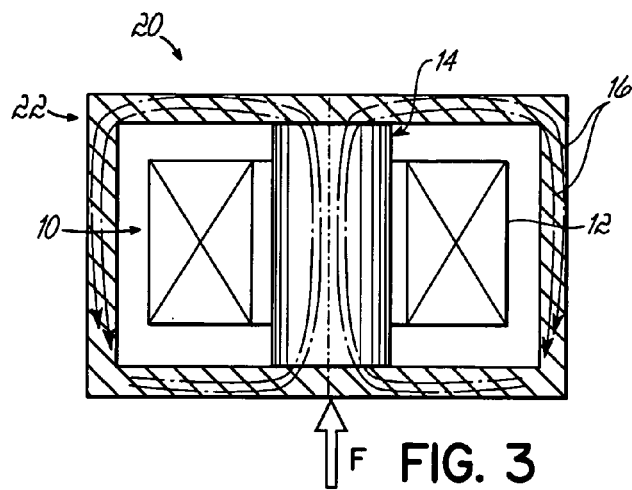
FIG. 3 schematically depicts a force sensor of the present invention, having a shell completely enclosing the magnetostrictive shaft and coil.

Referring to FIG. 2, the return path of the magnetic flux around coil 12, depicted by lines 16, is in a position to be affected (interfered with) by the surrounding environment. Referring to Eq. 3 above, to eliminate dependency on the return path, the second term in the equation, namely:

$$L_{ret} = N^2 \left[ \frac{\mu_{ret} A_{ret}}{l_{ret}} \right] \quad (4)$$

needs to have a constant value. To this end, a universal sensor 20 is provided by enclosing the sensor 10 in a magnetic shell 22, as shown in FIG. 3. This shell 22 forces the magnetic return flux 16 to a specific path, thus forcing the terms $\mu_{ret}$, $A_{ret}$, and $l_{ret}$ to the characteristic and dimensions of the shell 22.

Various magnetic, conducting or non-conducting materials may be envisioned by a person having ordinary skill in the art for the surrounding shell 22. An ideal material for shell 22 would be one with a low resistivity $\rho$ and a high permeability $\mu$. The low resistivity would generate sufficient eddy currents to restrict the field to within the shell 22, thus making it possible to use a relatively thin shell. At the same time, the high permeability would result in large generated magnetic fields, and thus, strong signals. An exemplary shell material may have a permeability $\mu$ of at least about 200, and advantageously, at least about 500. A further exemplary shell material may have a resistivity less than about 40 $\mu\Omega$-cm, and advantageously, less than about 20 $\mu\Omega$-cm. Many steels would therefore constitute ideal shell materials.

Shell thickness can be determined by calculating the material skin depth $\delta$, which is a function of frequency f, permeability $\mu$, and resistivity $\rho$. The formula for skin depth in a planar structure is:

$$\delta = \sqrt{\frac{\rho}{\pi f \mu}}$$

The shell thickness should be at least equal to the skin depth, and advantageously at least several times the skin depth, in order to minimize the flux beyond the shell 22. If it is equal to the skin depth, about 63% of the flux will be confined to the shell. If it is three times as thick as the skin depth, approximately 95% of the flux will be confined to the shell. Depending on frequency f, a shell thickness on the order of 0.5 mm (above 1 kHz), or about 1–2 mm (at lower frequency, such as 100 Hz to 1 kHz), would be sufficient. A larger thickness may be needed at yet lower frequencies, and would be acceptable in ensuring mechanical strength, ease of packaging, etc. because more flux would be carried by the shell 22. Relating the shell thickness to the skin depth $\delta$ is thus a way to provide a desirable minimum dimension.

Shell materials with a higher resistivity $\rho$ could be also considered, and are within the scope of this invention. Their use would make it necessary to use a thicker shell, making for a bulkier sensor. However, size is not always a critical design element. Larger sizes may even be necessary in some designs to increase mechanical stiffness, for instance. At the same time, with a higher resistivity comes the possibility to use higher frequencies.

Figure 4:
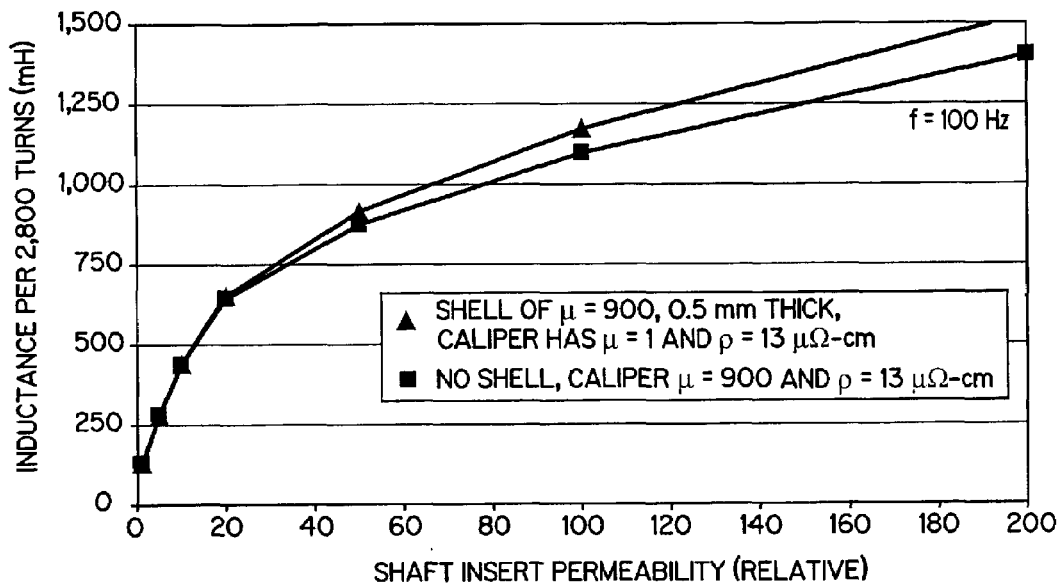
FIG. 4 is a graphical depiction of the inductance of the coil as a function of the permeability of the shaft material.

FIG. 4 shows the result of finite element analysis of an exemplary design for a universal sensor 20 of the present invention comprising a cylindrical shaft 14 surrounded by a coil 12 with 2,800 turns. The shaft 14 was 19 mm long, with a diameter of 10 mm. A shell 22 was modeled around the sensor 10 with a thickness of 0.5 mm, a permeability $\mu$ of 900 and a resistivity $\rho$ of 13 $\mu\Omega$-cm, which values are typical of common steels of the 1000 series. The inductance L of the coil 12 is calculated for various permeabilities of the shaft material, in three different scenarios. The curve with the caption "no shell, caliper $\mu$=900" corresponds to a sensor 10 placed inside a steel caliper environment of $\mu$=900. This curve also corresponds to a sensor 20 of the present invention with a shell 22 of $\mu$=900, and a surrounding steel caliper of also $\mu$=900. The second curve, which is just above the first curve, corresponds to the same sensor 20 with shell 22, surrounded by an aluminum alloy environment of $\mu$=1. By virtue of shell 22, it is seen that the signal varies by only about 7% as the surrounding material changes from a highly permeable material (steel) to one that is not permeable (aluminum). This difference in signal may be further reduced, either by increasing the frequency from the 100 Hz used in this example, or by increasing the thickness of the shell 22.

Figure 5:
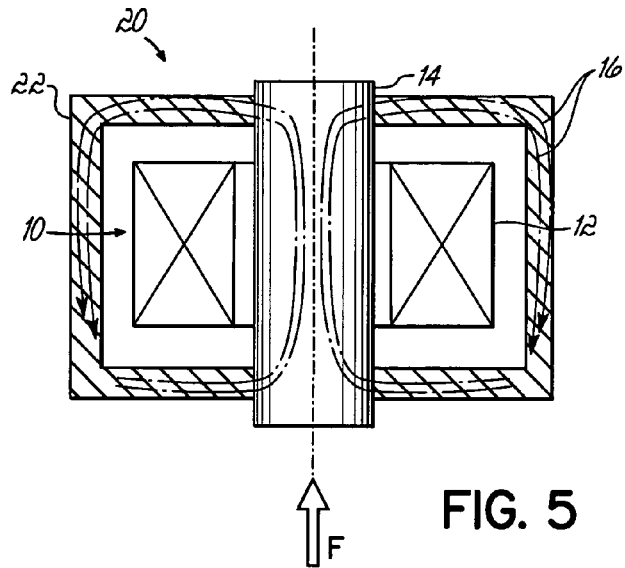
FIG. 5 schematically depicts a force sensor of the present invention, having a shell enclosing the coil with the magnetostrictive shaft protruding outside of the shell.

Several variations are possible for the shell 22 in accordance with the present invention. First, the shape of shell 22 need not be rectangular as shown in the figures. Second, the shell 22 may be close to or touching the surrounding material, or may be at some distance from the surrounding material. Third, the thickness of shell 22 need not be uniform. Fourth, and perhaps most importantly, shell 22 may completely enclose the sensor 10 as shown in FIG. 3, or enclose only the coil 12 as shown in FIG. 5. In the latter embodiment, the sensor shaft 14 may protrude by any desired length outside of the shell 22, and may protrude at one end or both ends of the shaft 14. This protrusion would have the advantage of providing a direct physical contact between the sensing shaft 14 and the surface that is providing the force F being measured. Whether the shaft 14 is enclosed in the shell 22 or protruding through shell 22, the shaft 14 and shell 22 are advantageously in physical contact, or as close to physical contact as practical, to facilitate restriction of the magnetic flux 16 to a path through the shaft 14 and shell 22, as shown both in FIGS. 3 and 5.

It is also to be understood that magnetostrictive shaft 14 may be of any desirable shape, cylindrical or otherwise. It may be a separate piece, or an integral part of the structure through which the force to be measured is applied. Also, several materials may be used in combination to make shaft 14, for instance to facilitate insertion of the sensor in the larger apparatus, or for any other practical reason.

There are various ways to make the shell 22 and to incorporate it with the sensor 10, as may be appreciated by a person having ordinary skill in the art. One way consists of making a shell 22 as a separate piece and using it as a "housing" for the sensor 10. In some cases, it may be desirable to manufacture the sensor 10 without a shell 22, and then prepare the location where the sensor 10 will be placed with a specific material that is both conductive and permeable. In other words, shell 22 is then a part of the environment in which sensor 10 will later be placed. One way of preparing the sensor location consists of coating the cavity prior to inserting the sensor. Various coatings methods are known in the art.

Figure 6:
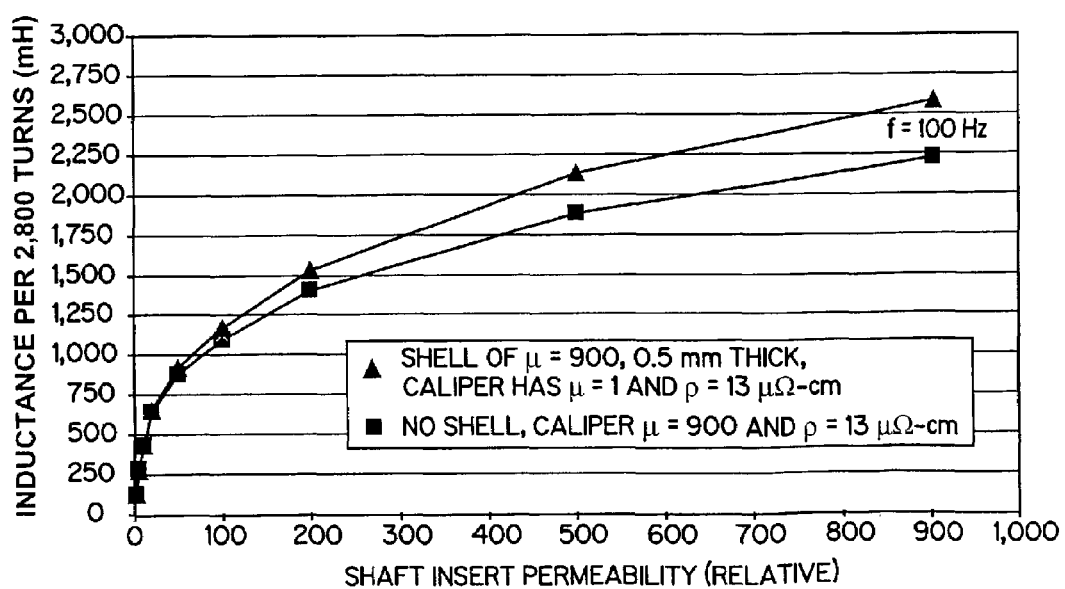
FIGS. 6 and 7 are graphical depictions of the inductance of the coil as a function of the permeability of the shaft in the presence of applied frequencies of 100 Hz and 10 kHz, respectively.
Figure 7:
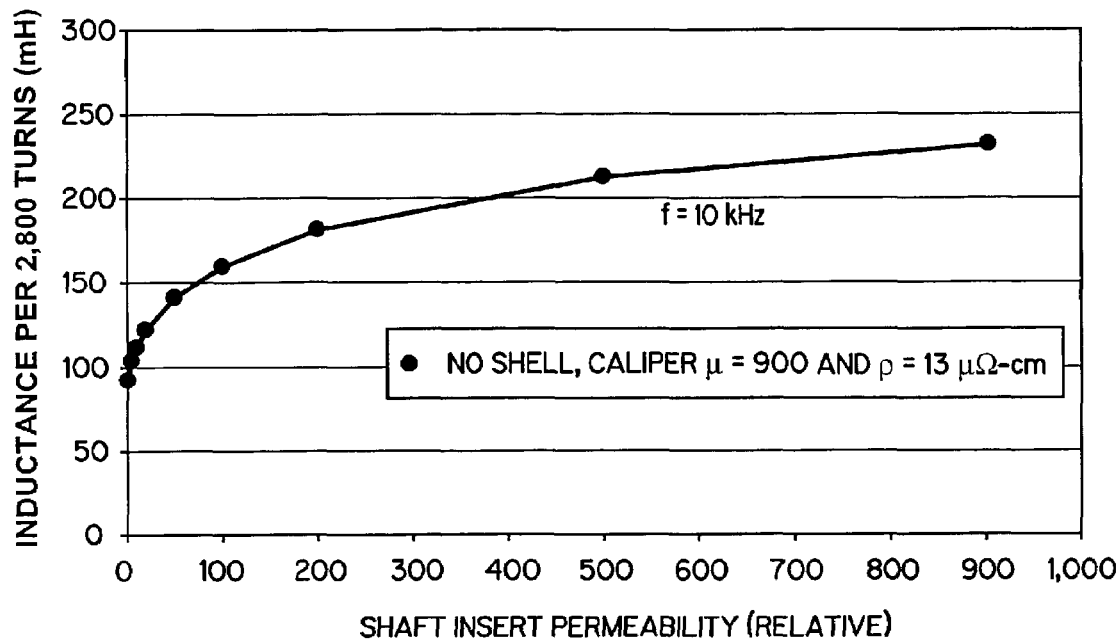

It may be appreciated from FIG. 4 that the inductance L of the coil 12 depends on the permeability $\mu$ of the magnetostrictive shaft 14. In the presence of stress, this permeability will vary from some value $\mu_{max}$ to some value $\mu_{min}$. A large difference between the two is desirable, but the average value also has an impact on inductance L. This is because the overall inductance is very sensitive to permeability changes for low values of shaft insert permeability, but tends to reach a plateau or asymptot for higher values of shaft insert permeability, as seen in FIG. 4. Given, for instance, and in the case of FIG. 4, a difference $(\mu_{max}-\mu_{min})$ of 50, the resulting inductance variation is approximately 600 mH if $\mu_{max}$ is 60, which is significantly larger than the variation of approximately 200 mH when $\mu_{max}$ is 200. The same effect is shown in FIGS. 6 and 7, for shaft permeabilities (abscissa axis) ranging from 1 to 900. FIG. 6 corresponds to an applied frequency of 100 Hz, with a steel shell 22 and surrounding aluminum environment (top line), or all steel (bottom line). FIG. 7 corresponds to an applied frequency of 10 kHz, with all steel.

The following design guidelines may be followed in forming a sensor 20 in accordance with the present invention. It is preferable to operate with a shaft material having a lower permeability $\mu_{sh}$, on the order of less than about 200, and preferably less than about 50. This is because the inductance change for a given $\Delta\mu$ is much larger at lower values of $\mu$. Favorable exemplary materials are nickel and nickel alloys. Also, some stainless steels (series 300) are possible. They are considered "non-magnetic"; however, they exhibit a permeability on the order of 10 (small compared to most steels, which exhibit permeabilities of 1,000 or more).

As far as operating frequency is concerned, from lower to higher frequencies, the inductance L tends to drop, because, with eddy currents, the effective cross-section A of the magnetic flux path 16 is reduced. In the same exemplary study, a drop of a factor of about 10 was found between 100 Hz and 10 kHz, as can be seen by comparing FIGS. 6 and 7. However, the signal voltage $V_{coil}$, according to Eq. 1, is proportional to frequency f, and therefore, from that point of view, there is an advantage to operating at higher frequencies. There is, therefore, an optimum range of operating frequencies balancing these two contradictory trends.

Figure 10:
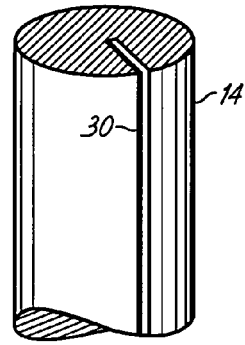
FIG. 10 is a depiction of a magnetostrictive shaft having a radial slit extending along the length of the shaft parallel to the shaft axis along a radius.
Figure 8:
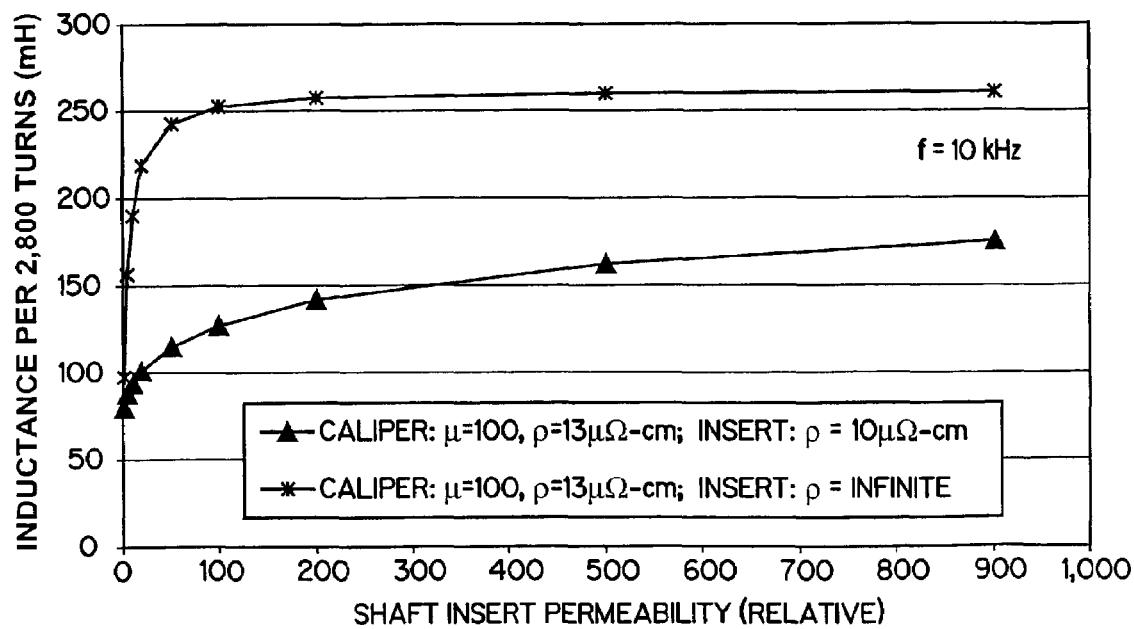
FIG. 8 is a graphical depiction of the impact of the resistivity and permeability of the magnetostrictive shaft on the inductance of the coil.

Since the optimum operating frequency and signal output is a function of eddy currents, it is a function of material resistivity. FIG. 8 shows the impact of the resistivity $\rho$ of the magnetostrictive shaft 14 on the inductance L. The calculations were performed at 10 kHz, with a surrounding material of $\mu=100$. In one case (upper trace), the shaft resistivity $\rho$ is infinite; in the other case (lower trace), the resistivity $\rho$ is 10 $\mu\Omega$-cm, corresponding approximately to some steels or nickel alloys. It can be concluded that higher resistivities are better because the flux penetrates more, thus expanding the effective flux cross-section A. However, the increase in inductance L is only 50% over a very large range of resistivities, making it therefore a factor of only a secondary nature. It can be further concluded that with higher resistivities, it is increasingly important to work with low-permeability shaft materials, as the knee of the curve is more pronounced, and located at increasingly lower values of $\mu$. Higher resistivities can be achieved, for instance, by using powder metal as a base material for the shaft 14. Higher resistivities can also be obtained by fabricating a composite material of magnetic and electrically insulating components. Also, a radial slit (or slits) 30 made in the shaft 14, as depicted in FIG. 10 can increase the resistance of the eddy current path. One slit may be sufficient to multiply the resistance by a factor of 4 or more.

Figure 9:
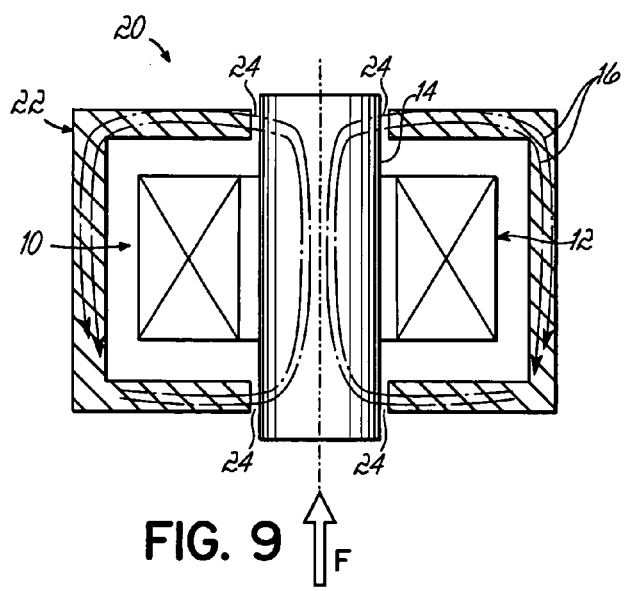
FIG. 9 is a schematic depiction of the force sensor of FIG. 5, having airgaps in the shell.

In addition, it is desirable to minimize all airgaps 24 in the path 16 of the magnetic flux, as shown in FIG. 9. Airgaps 24 in the flux path 16 tend to dominate the inductance L, like a portion of high-resistivity wire would dominate the resistance of a long wire. Therefore, changes in inductance L of the shaft 14 as a response to varying stress would be drowned by the constant inductance of the airgap 24. As stated previously, it is advantageous to have, as much as practical, physical contact between the shaft 14 and shell 22, as shown in FIGS. 3 and 5, and thus, no air gaps. If it is necessary to have some airgap in-between, for instance to accommodate different coefficients of expansion, or to avoid physically restraining shaft 14, then, the design should strive to minimize the airgap reluctance, by minimizing its length, and giving it a larger cross-section.

In use, a universal force sensor 20 of the present invention will exhibit similar signals without regard to the material or environment surrounding the sensor. The same universal force sensor 20 may thus be placed inside a steel brake caliper, a seat cushion or any other desired environment.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. For example, an outer shell 22 made of a conductive, permeable material, such as steel, has been described for a force sensor 20 consisting of a single coil 12 around a shaft 14. However, shell 22 would apply equally well to multi-coil force sensors based on the measurement of the mutual inductance between two coils, etc. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A force sensor comprising a shaft of magnetostrictive material, at least one inductance coil wound around the shaft, and a magnetic shell enclosing at least the coil wherein, upon application of a magnetic field, a resultant flow of magnetic flux is confined to a path through the shaft and the magnetic shell, and wherein the magnetic shell has a thickness at least equal to its skin depth, wherein skin depth is calculated by the formula:

$$\delta = \sqrt{\frac{\rho}{\pi f \mu}}$$

where f is the frequency imposed on the coil, $\mu$ is the permeability of the magnetic shell material and $\rho$ is the resistivity of the magnetic shell material.

2. The force sensor of claim 1 wherein the magnetic shell has a thickness at least 3 times its skin depth.

3. The force sensor of claim 1 wherein the shaft comprises a material of permeability $\mu$ less than about 200.

4. The force sensor of claim 3 wherein the shaft comprises a material of permeability $\mu$ less than about 50.

5. The force sensor of claim 3 wherein the shaft comprises nickel or a nickel alloy.

6. The force sensor of claim 1 wherein the shaft comprises powder metal.

7. The force sensor of claim 1 wherein the shaft comprises composite material.

8. The force sensor of claim 1 wherein the shaft includes at least one radial slit.

9. The force sensor of claim 1 wherein the magnetic shell comprises a material of permeability $\mu$ greater than about 200.

10. The force sensor of claim 9 wherein the magnetic shell comprises a material of permeability $\mu$ greater than about 500.

11. The force sensor of claim 1 wherein the magnetic shell comprises a conducting material.

12. The force sensor of claim 1 wherein the magnetic shell comprises a conducting material of resistivity $\rho$ less than about 40 $\mu\Omega$-cm.

13. The force sensor of claim 1 wherein the magnetic shell comprises a conducting material of resistivity $\rho$ less than about 20 $\mu\Omega$-cm.

14. A force sensor comprising a shaft of magnetostrictive material, at least one inductance coil wound around the shaft, and a magnetic shell enclosing at least the coil wherein, upon application of a magnetic field, a resultant flow of magnetic flux is confined to a path through the shaft and the magnetic shell, and wherein the shaft includes at least one radial slit.

15. The force sensor of claim 14 wherein the shell comprises steel and the shell encloses the coil and the shaft.

16. The force sensor of claim 14 wherein the shell comprises steel and the shaft protrudes through the shell.

17. A force sensor comprising a shaft of magnetostrictive material, at least one inductance coil wound around the shaft, and a magnetic shell enclosing at least the coil wherein, upon application of a magnetic field, a resultant flow of magnetic flux is confined to a path through the shaft and the magnetic shell, and wherein the magnetic shell is in physical contact with the shaft and wherein the shaft includes at least one radial slit.

18. A force sensor comprising a shaft of magnetostrictive material, at least one inductance coil wound around the shaft, and a steel shell enclosing the coil and the shaft wherein, upon application of a magnetic field, a resultant flow of magnetic flux is confined to a path through the shaft and the shell, and wherein the shell has a thickness at least equal to its skin depth, wherein skin depth is calculated by the formula:

$$\delta = \sqrt{\frac{\rho}{\pi f \mu}}$$

where f is the frequency imposed on the coil, $\mu$ is the permeability of the magnetic shell material and $\rho$ is the resistivity of the magnetic shell material.

19. The force sensor of claim 18 wherein the shell has a thickness at least 3 times its skin depth.

20. The force sensor of claim 18 wherein the shaft comprises a material of permeability $\mu$ less than about 200.

21. The force sensor of claim 20 wherein the shaft comprises a material of permeability $\mu$ less than about 50.

22. The force sensor of claim 18 wherein the shaft comprises nickel or a nickel alloy.

23. The force sensor of claim 18 wherein the shaft comprises powder metal.

24. The force sensor of claim 18 wherein the shaft comprises composite material.

25. The force sensor of claim 18 wherein the shaft includes at least one radial slit.

26. A force sensor comprising a shaft of magnetostrictive material, at least one inductance coil wound around the shaft, and a steel shell enclosing the coil wherein the shaft protrudes through the shell, and wherein, upon application of a magnetic field, a resultant flow of magnetic flux is confined to a path through the shaft and the shell, and wherein the shell has a thickness at least equal to its skin depth, wherein skin depth is calculated by the formula:

$$\delta = \sqrt{\frac{\rho}{\pi f \mu}}$$

where f is the frequency imposed on the coil, $\mu$ is the permeability of the magnetic shell material and $\rho$ is the resistivity of the magnetic shell material.

27. The force sensor of claim 26 wherein the shell has a thickness at least 3 times its skin depth.

28. The force sensor of claim 26 wherein the shaft comprises a material of permeability $\mu$ less than about 200.

29. The force sensor of claim 28 wherein the shaft comprises a material of permeability $\mu$ less than about 50.

30. The force sensor of claim 26 wherein the shaft comprises nickel or a nickel alloy.

31. The force sensor of claim 26 wherein the shaft comprises powder metal.

32. The force sensor of claim 26 wherein the shaft comprises composite material.

33. The force sensor of claim 26 wherein the shaft includes at least one radial slit.

34. The force sensor of claim 26 wherein the magnetic shell is in physical contact with the shaft.

35. The force sensor of claim 26 wherein the magnetic shell is in physical contact with the shaft.

* * * * *